Patented June 24, 1930

1,766,760

UNITED STATES PATENT OFFICE

HAROLD A. MORTON, OF AKRON, OHIO

ALDEHYDE AND ANTIOXIDANT AGENT AND PROCESS

No Drawing.   Application filed August 17, 1928.   Serial No. 300,371.

Considerable difficulty is experienced in the storage and handling of various aldehydes, due to oxidation to corresponding acids. This oxidation results in the contamination of the aldehyde with undesirable acids; in the destructive action of the acid on the containers; and in the discoloration of the product and accumulation of impurities due to the corrosive action of the acid on the metal container.

My invention relates to the retardation or prevention of the oxidation of aldehydes by the addition of a material possessing antioxidant properties.

According to my invention, the aldehyde or aldehyde solution to be preserved has as an added ingredient a small quantity of a derivative of hydroglyoxaline.

There are a great number of such hydroglyoxaline derivatives which function in this manner. These derivatives are designated in this specification by the accustomed nomenclature now in general use. The basic material, glyoxaline, from which these substances are derived is usually given the following chemical formula:

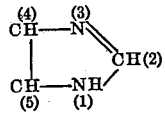

The substances described in this specification are hydroglyoxalines or substituted hydroglyoxalines and their derivatives. In general they may be prepared by heating a 1-2 diamino ethane derivative with the desired aldehyde, although other methods of preparation may be employed.

As examples of compounds of this class which have been found to have anti-oxidant properties I may mention the following:

2-4-5 triphenyl di hydroglyoxaline
2-4-5 tri furyl di hydroglyoxaline
2-4-5 tri tolyl di hydroglyoxaline
1-3 di phenyl tetra hydroglyoxaline
1-3 di ortho tolyl tetra hydroglyoxaline
1-3 di para tolyl tetra hydroglyoxaline
1-3 di xylyl tetra hydroglyoxaline
1-3 di alpha naphthyl tetra hydroglyoxaline
1-3 di beta naphthyl tetra hydroglyoxaline
1-3    phenyl ortho tolyl tetra hydroglyoxaline
1-3    phenyl alpha naphthyl tetra hydroglyoxaline
1-3 di phenyl 2-methyl tetra hydroglyoxaline
1-3 di phenyl 2-vinyl tetra hydroglyoxaline
1-3 di phenyl 2-propyl tetra hydroglyoxaline
1-3 di phenyl 4-pseudo butyl tetra hydroglyoxaline
1-3 di phenyl 2-propenyl tetra hydroglyoxaline
1-3 di phenyl 2-furyl tetra hydroglyoxaline
1-3 di phenyl 2-hexyl tetra hydroglyoxaline
1-2 di phenyl 3-beta naphthyl tetra hydroglyoxaline
1-3    phenyl beta naphthyl 2-furyl tetra hydroglyoxaline
1-3 di alpha naphthyl 2-propyl tetra hydroglyoxaline
1-2-3 triphenyl tetra hydroglyoxaline
1-3 di phenyl 2-methoethyl tetra hydroglyoxaline
1-3 di ortho tolyl 2-propyl tetra hydroglyoxaline
1-3 di para tolyl 2-methyl tetra hydroglyoxaline
1-3 di xylyl 2-furyl tetra hydroglyoxaline
1-3 di alpha naphthyl 2-propenyl tetra hydroglyoxaline
1-3 di alpha naphthyl 2-phenyl tetra hydroglyoxaline
1-3 di beta naphthyl 2-methyl tetra hydroglyoxaline
1-3    phenyl ortho tolyl 2-propyl tetra hydroglyoxaline
1-3 di phenyl 4-methyl tetra hydroglyoxaline
1-3 di ortho tolyl 4-methyl tetra hydroglyoxaline
1-3 di para tolyl 4-methyl tetra hydroglyoxaline
1-3 di xylyl 4-methyl tetra hydroglyoxaline
1-3 di alpha naphthyl 4-methyl tetra hydroglyoxaline
1-3 di beta naphthyl 4-methyl tetra hydroglyoxaline
1-3 di phenyl 4-ethyl tetra hydroglyoxaline
1-3 di para tolyl 4-ethyl tetra hydroglyoxaline
1-3 di alpha naphthyl 2-methyl 4-methyl tetra hydroglyoxaline
1-3 di phenyl 2-propyl 4-methyl tetra hydroglyoxaline
1-3    phenyl para tolyl 2-thio tetra hydroglyoxaline
1-3 di phenyl 2-thio tetra hydroglyoxaline
1-3    ortho tolyl xylyl 2-thio tetra hydroglyoxaline
1-3 di phenyl 2-thio 4-methyl tetra hydroglyoxaline
1-3 di phenyl 2-thio 4-5-dimethyl tetra hydroglyoxaline
1-3 di phenyl 2-4-dimethyl tetra hydroglyoxaline
1-3 di phenyl 2-vinyl 4-methyl tetra hydroglyoxaline
1-3 di phenyl 2-propenyl 4-methyl tetra hydroglyoxaline
1-3 di phenyl 2-furyl 4-methyl tetra hydroglyoxaline
1-3 di phenyl 2-hexyl 4-methyl tetra hydroglyoxaline
1-3 di phenyl 2-methoethyl 4-methyl tetra hydroglyoxaline
1-2-3 triphenyl 4-methyl tetra hydroglyoxaline
1-3 di ortho tolyl 2-4-dimethyl tetra hydroglyoxaline
1-3 di para tolyl 2-propyl 4-methyl tetra hydroglyoxaline
1-3 di xylyl 2-furyl 4-methyl tetra hydroglyoxaline
1-3 di alpha naphthyl 2-phenyl 4-methyl tetra hydroglyoxaline
1-3 di beta naphthyl 2-propenyl 4-methyl tetra hydroglyoxaline
1-3 di phenyl 4-5-dimethyl tetra hydroglyoxaline
1-3 di phenyl 2-methyl 4-ethyl tetra hydroglyoxaline
1-3 di ortho tolyl 2-vinyl 4-ethyl tetra hydroglyoxaline
1-3 di xylyl 2-propyl 4-ethyl tetra hydroglyoxaline
1-3 di alpha naphthyl 2-phenyl 4-ethyl tetra hydroglyoxaline
1-3 di phenyl 4-4-dimethyl tetra hydroglyoxaline
1-3 di ortho tolyl 4-4-dimethyl tetra hydroglyoxaline
1-3 di para tolyl 4-4-dimethyl tetra hydroglyoxaline
1-3 di xylyl 4-4-dimethyl tetra hydroglyoxaline
1-3 di alpha naphthyl 4-4-dimethyl tetra hydroglyoxaline
1-3 di beta naphthyl 4-4-dimethyl tetra hydroglyoxaline
1-3 di phenyl 2-propyl 4-pseudo butyl tetra hydroglyoxaline
1-3 di phenyl 2-4-5-trimethyl tetra hydroglyoxaline
1-3 di phenyl 2-propenyl 4-5-dimethyl tetra hydroglyoxaline
1-3 di phenyl 2-propyl 4-5-dimethyl tetra hydroglyoxaline
1-3 di phenyl 2-furyl 4-5-dimethyl tetra hydroglyoxaline
1-2-3-triphenyl 4-5-dimethyl tetra hydroglyoxaline
1-3 di phenyl 2-vinyl 4-5-dimethyl tetra hydroglyoxaline
1-3 di ortho tolyl 2-furyl 4-5-dimethyl tetra hydroglyoxaline
1-3 di para tolyl 2-phenyl 4-5-dimethyl tetra hydroglyoxaline
1-3 di xylyl 2-vinyl 4-5-dimethyl tetra hydroglyoxaline
1-3 di alpha naphthyl 2-propyl 4-5-dimethyl tetra hydroglyoxaline
1-3 di beta naphthyl 2-4-5-trimethyl tetra hydroglyoxaline
1-3 di phenyl 2-4-4-trimethyl tetra hydroglyoxaline
1-3 di phenyl 2-vinyl 4-4-dimethyl tetra hydroglyoxaline
1-2-3-triphenyl 4-4-dimethyl tetra hydroglyoxaline
1-3 di ortho tolyl 2-propyl 4-4-dimethyl tetra hydroglyoxaline
1-3 di phenyl 4-4-5-trimethyl tetra hydroglyoxaline
1-3 di phenyl 2-4-4-5-tetra methyl tetra hydroglyoxaline
1-3 di phenyl 1-2-propyl 4-4-5-trimethyl tetra hydroglyoxaline
1-2-3-triphenyl 4-4-5-trimethyl tetra hydroglyoxaline As indicated in the foregoing examples, the C atom in the 2 position of substituted 2-3 di hydroglyoxaline (or of substituted 2-3-4-5 tetra hydroglyoxaline) may have attached thereto any of the following:

H, S, $CH_3$, $CH_3CH_2$, $CH_3CH_2CH_2$, $(CH_3)_2CH$, $CH_3CH_2CH_2CH_2$, $(CH_3)_2CH.CH_2$, $CH_3CH_2CH_2CH_2CH_2$, $(CH_3)_2CH.CH_2CH_2$, $C_6H_5$, $C_6H_4CH_3$, $C_6H_3(CH_3)_2$, $C_6H_5CH_2$, $CH_2CH=CH$, $CH_2=CH$, $CH_3CH_2CH_2CH=C(C_2H_5)$, $C_4H_3O$, $CH_3CH_2CH_2CH_2CH_2CH_2$, or in general any aliphatic or aromatic groups, whether saturated or unsaturated. These radicals I consider members of the class which may be designated, and in some of the appended claims are identified by the term, "2 modifying group."

Independent of the special member which may be used in "2 modifying group", one or more of the hydrogen atoms which are attached to the nitrogen atoms in the 1-3 positions may be replaced by any of the following:

$CH_3$, $CH_3CH_2$, $CH_3CH_2CH_2$, $(CH_3)_2CH$, $CH_3CH_2CH_2CH_2$, $(CH_3)_2CH.CH_2$, $CH_3CH_2CH_2CH_2$, $(CH_3)_2CH.CH_2CH_2$, $C_6H_5$, $C_6H_4CH_3$, $C_6H_3(CH_3)_2$, $C_6H_5CH_2$, $CH_2CH=CH$, $CH_2=CH$, $CH_3CH_2CH_2CH=C(C_2H_5)$, $C_4H_3O$, $CH_3CH_2CH_2CH_2CH_2CH_2$, or in general any aliphatic or aromatic group, whether saturated or unsaturated. These radicals I consider members of a class which may be designated and in some of the appended claims are identified by the term, "1-3 replacement group."

One or both of the C atoms may also in the 4-5 positions have attached thereto one or more of the following:

H, $CH_3$, $CH_3CH_2$, $CH_3CH_2CH_2$, $(CH_3)_2CH$, $CH_3CH_2CH_2CH_2$, $(CH_3)_2CH.CH_2$, $CH_3CH_2CH_2CH_2$, $(CH_3)_2CH.CH_2CH_2$, $C_6H_5$, $C_6H_4CH_3$, $C_6H_3(CH_3)_2$, $C_6H_5CH_2$, $CH_2CH=CH$, $CH_2=CH$, $CH_3CH_2CH_2CH=C(C_2H_5)$, $C_4H_3O$, $CH_3CH_2CH_2CH_2CH_2CH_2$, or in general any aliphatic or aromatic group, whether saturated or unsaturated. These I consider members of a class which may be designated and in some of the appended claims I have identified by the term, "4-5 modifying group."

It is to be understood, however, that strongly negative groups such as $C_6H_5CO$, $CH_3CO$, or groups containing halogens, or nitro groups, may not be used in any position of the compounds.

The above examples which are of value in practicing this invention, serve to indicate the wide range of materials of this type which are valuable in the prevention of the oxidation of aldehydes. However, they are given only as typical examples and this invention is not limited to these specific compounds, as many modifications may be made without departing from the spirit of the invention.

For example it is not only possible to use the free bases of the above series but it is also possible to use salts and soaps formed from these materials without materially affecting the anti-oxidant value.

One of the preferred members of the above series is 1-3 diphenyl 2-propyl tetra hydroglyoxaline. One method of preparing this material is to heat 100 parts of 1-2 di (phenyl amino) ethane dissolved in alcohol with 40 parts of butyraldehyde under reflux for several hours. Upon cooling and crystallizing there is obtained a cream colored solid, which is dried and is then ready for use.

The tetra hydroglyoxaline derivatives referred to in this specification are prepared in general by the action of aldehydes on the corresponding 1-2 diamino ethane derivatives and are considered to have the glyoxaline constitution as given. However, I do not wish to be bound by any of the theories or constitutions given in this specification but desire to protect the class of materials formed in this manner.

The thio tetra hydroglyoxaline derivatives are prepared in general by the action of carbon disulphide on the corresponding 1-2 diamino ethane derivatives and are considered to have the hydroglyoxaline constitution. However, I do not wish to be bound by this theory but desire to claim that class of materials formed by the reaction of thio carbonyl chloride and 1-2 diamino ethane derivatives.

The amount of the material which is used may vary considerably, but it has been found that quantities ranging from 0.25% to 1.0% produce good results. Of course a smaller amount of material may be used if this preserving action need not be so great and correspondingly the quantity may be increased considerably above 1% if it seems desirable.

In general the compounds of this invention are easily prepared and some member of the group is soluble in each of the common aldehydes. The activity of these materials is not destroyed by a relatively high temperature. In general these compounds impart no undesirable characteristics to the aldehydes.

The process may be used in any place where it is desirable to prevent the oxidation of aldehydes, whether this be during storage and handling or during the course of chemical reactions.

The process of this invention may also be practiced with any material which contains aldehyde groups and which has a tendency to become oxidized.

To illustrate the manner in which the foregoing materials may be used and the effect which they have on the oxidation of aldehydes the following examples are given:

*Example I*

A sample of butylaldehyde contained in a small flask equipped with a reflux condenser was treated with a comparatively rapid stream of dry oxygen at ordinary temperature. The same conditions were used in a series of other flasks containing butylaldehyde in the presence of various substituted hydroglyoxaline and the rate of oxidation measured by analyzing the butylaldehyde at regular intervals for the amount of butyric acid formed.

The difference in oxidation is also very readily noted by the relative change in temperature. The butylaldehyde containing no anti-oxidant, developed considerable heat as oxidation progressed, whereas, the butylaldehyde samples in the presence of these anti-hyde samples in the presence of these antioxidants showed no appreciable increase in temperature.

The amount of butyric acid was determined at the end of a six hour period of treatment with oxygen. In all cases 0.5% of anti-oxidant was employed.

In the present example the control, which consisted of butylaldehyde in the absence of an anti-oxidant, showed an acidity of 36.5% butyric acid at the end of the six hour oxidation period.

The following table gives the acidity at the end of this six hour period, for members of this class of compounds.

Anti-oxidant: 2-4-5 trifuryl di hydroglyoxaline
Acidity     : 2.1%
Anti-oxidant: 1-3 diphenyl 2-methyl tetra hydroglyoxaline
Acidity     : 1.1%
Anti-oxidant: 1-3 diphenyl 2-propyl tetra hydroglyoxaline
Acidity     : 0.8%
Anti-oxidant: 1-3 diphenyl 2-propenyl tetra hydroglyoxaline
Acidity     : 1.2%
Anti-oxidant: 1-3 diphenyl 2-propyl 4-methyl tetra hydroglyoxaline
Acidity     : 0.7%
Anti-oxidant: 1-3 diphenyl 2-4-5 trimethyl tetra hydroglyoxaline
Acidity     : 1.1%
Anti-oxidant: 1-3 di alpha naphthyl 2-propyl 4-5 dimethyl tetra hydroglyoxaline
Acidity     : 0.8%

*Example II*

To illustrate the use of these materials for the prevention of oxidation of benzaldehyde to benzoic acid the following example is given:

The method of procedure was the same as that given in Example I, except that a period of 24 hours treatment with oxygen was employed. At the end of this period the benzaldehyde containing no anti-oxidant material contained 10.1% of benzoic acid.

The effect of several of these anti-oxidant materials in a 24 hours oxidation period is shown in the following table:

Anti-oxidant: 1-3 diphenyl tetra hydroglyoxaline
Acidity     : 3.0%
Anti-oxidant: 1-3 diphenyl 2-propyl tetra hydroglyoxaline
Acidity     : 2.3%
Anti-oxidant: 1-3 diphenyl 2-propyl 4-methyl tetra hydroglyoxaline
Acidity     : 2.45%

The above examples are illustrative of the various methods of carrying out this invention.

What I claim is:

1. The method of retarding the oxidation of aldehydes which comprises adding to the aldehyde a derivative of hydrogenated glyoxaline.

2. The method of retarding the oxidation of aldehydes which comprises adding to the aldehyde a derivative of di hydroglyoxaline.

3. The method of retarding the oxidation of aldehydes which comprises adding to the aldehyde a derivative of tetra hydroglyoxaline.

4. The method of retarding the oxidation of aldehydes which comprises adding to the aldehyde a di-aryl tetra hydroglyoxaline.

5. The method of retarding the oxidation of aldehydes which comprises adding to the aldehyde a tetra hydroglyoxaline derivative wherein aromatic radicals are substituted in the 1-3 positions and aliphatic radicals in one of the 2-4-5 positions.

6. The method of retarding the oxidation of aldehydes which comprises adding to the aldehyde a tetra hydroglyoxaline derivative wherein aromatic radicals are substituted in the 1-3 positions and in one or more of the 2-4-5 positions.

7. The method of retarding the oxidation of aldehydes which comprises adding to the aldehyde a tetra hydroglyoxaline derivative wherein aromatic radicals are substituted in the 1-3 positions and an aliphatic radical in the 2 position.

8. The method of retarding the oxidation of aldehydes which comprises adding to the aldehyde a derivative of tetra hydroglyoxaline wherein the carbon atom in the 2 position has attached thereto a radical which is a member of the "2 modifying group", substantially as described.

9. The method of retarding the oxidation of aldehydes which comprises adding to the aldehyde a tetra hydroglyoxaline derivative wherein the carbon atom in the 2 position has attached thereto an aliphatic radical.

10. The method of retarding the oxidation of aldehydes which comprises adding to the aldehyde a tetra hydroglyoxaline derivative wherein the carbon atom in the 2 position has attached thereto a propyl radical.

11. The method of retarding the oxidation of aldehydes which comprises adding to the aldehyde a tetra hydroglyoxaline derivative wherein one of the hydrogen atoms attached to the nitrogen atoms in the 1 or 3 positions is replaced by a radical which is a member of the "1-3 replacement group."

12. The method of retarding the oxidation of aldehydes which comprises adding to the aldehyde a tetra hydroglyoxaline derivative wherein one of the hydrogen atoms attached to the nitrogen atoms in the 1 or 3 positions is replaced by an aliphatic radical.

13. The method of retarding the oxidation of aldehydes which comprises adding to the aldehyde a derivative of tetra hydroglyoxaline wherein one of the hydrogen atoms attached to the nitrogen atoms in the 1 or 3 positions is replaced by an aromatic radical.

14. The method of retarding the oxidation of aldehydes which comprises adding to the aldehyde a derivative of tetra hydroglyoxaline wherein one of the hydrogen atoms attached to the nitrogen atoms in the 1 or 3 positions is replaced by a phenyl radical.

15. The method of retarding the oxidation of aldehydes which comprises adding to the aldehyde a derivative of tetra hydroglyoxaline wherein each hydrogen atom attached to the nitrogen atoms in the 1-3 positions is replaced by a radical which is a member of the "1-3 replacement group."

16. The method of retarding the oxidation of aldehydes which comprises adding to the aldehyde the product prepared by condensing a derivative of 1-2 diamino ethane with an aldehyde.

17. The method of retarding the oxidation of aldehydes which comprises adding to the aldehyde a tetra hydroglyoxaline derivative wherein both hydrogen atoms attached to the nitrogen atoms in the 1-3 positions are replaced by an organic radical.

18. The method of retarding the oxidation of aldehydes which comprises adding to the aldehyde a derivative of tetra hydroglyoxaline wherein both hydrogen atoms attached to the nitrogen atoms in the 1-3 positions are replaced by an aromatic radical.

19. The method of retarding the oxidation of aldehydes which comprises adding to the aldehyde a derivative of tetra hydroglyoxaline wherein both hydrogen atoms attached to the nitrogen atoms in the 1-3 positions are replaced by a phenyl radical.

20. The method of retarding the oxidation of aldehydes which comprises adding to the aldehyde a derivative of tetra hydroglyoxaline wherein each of the carbon atoms in the 4-5-positions has a radical attached thereto which is a member of the "4-5 modifying group."

21. The method of retarding the oxidation of aldehydes which comprises adding to the aldehyde a derivative of tetra hydroglyoxaline wherein each of the carbon atoms in the 4-5 positions has two radicals attached thereto both of which are members of the "4-5 modifying group."

22. The method of retarding the oxidation of aldehydes which comprises adding to the aldehyde a derivative of tetra hydroglyoxaline wherein each of the carbon atoms in the 4-5 positions has a hydrogen atom attached thereto.

23. The method of retarding the oxidation of aldehydes which comprises adding to the aldehyde a derivative of tetra hydroglyoxaline wherein each of the carbon atoms in the 4-5 positions has two hydrogen atoms attached thereto.

24. The method of retarding the oxidation of aldehydes which comprises adding to the aldehyde 1-3 diphenyl 2-propyl tetra hydroglyoxaline.

In testimony whereof, I affix my signature.

HAROLD A. MORTON.